No. 730,469. PATENTED JUNE 9, 1903.
J. W. MORGENTHALER.
LAND ROLLER.
APPLICATION FILED JULY 14, 1902.
NO MODEL.

WITNESSES:
Guy V Worthington
John E Burch

INVENTOR
J. W. Morgenthaler
BY
Fred G Dieterich & Co
ATTORNEYS

THE NORRIS PETERS CO., PHOTO-LITHO., WASHINGTON, D. C.

No. 730,469. Patented June 9, 1903.

UNITED STATES PATENT OFFICE.

JOHN W. MORGENTHALER, OF JOPLIN, MISSOURI.

LAND-ROLLER.

SPECIFICATION forming part of Letters Patent No. 730,469, dated June 9, 1903.

Application filed July 14, 1902. Serial No. 115,423. (No model.)

*To all whom it may concern:*

Be it known that I, JOHN W. MORGENTHALER, residing at Joplin, in the county of Jasper and State of Missouri, have invented a new and Improved Land-Roller, of which the following is a specification.

My invention comprehends a new and improved construction of land-roller in which the roller-body includes an external shell of tiling or similar vitreous body and an internal solid filling so arranged and combined whereby to provide a roller of great weight and durability and which can be manufactured at a small cost.

In its more complete nature my invention includes in its makeup an external shell of tiling, a filling or core of concrete, supplemental end fillings, and tubular members axially embedded in the filling; and in its still more subordinate features my invention consists in certain details and combination of parts hereinafter fully explained, and specifically pointed out in the appended claims, reference being had to the accompanying drawings, in which—

Figure 1:
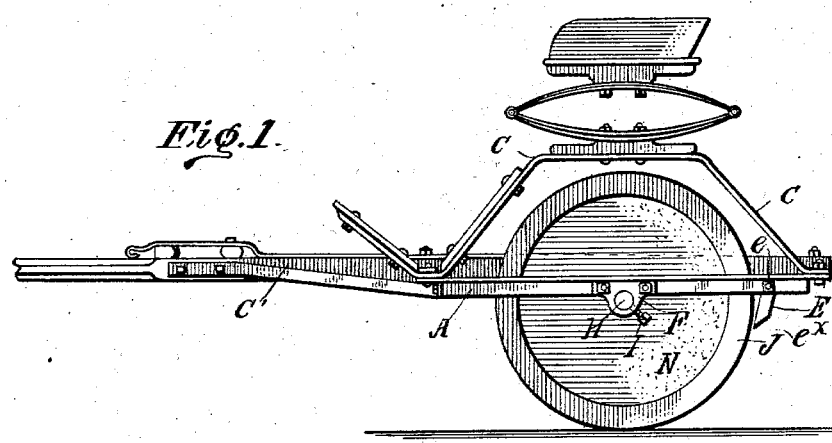
Figure 2:
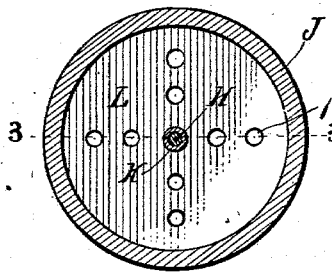
Figure 3:
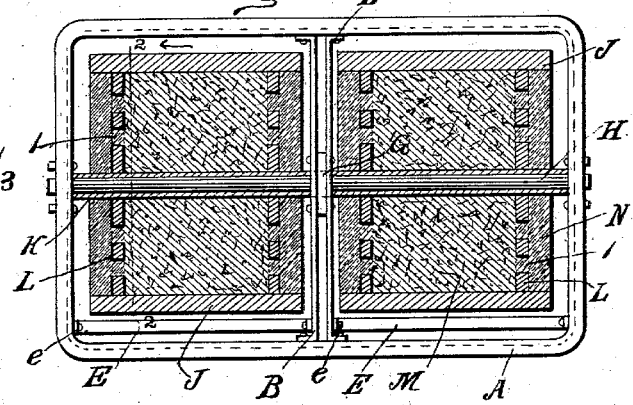
Figure 4:
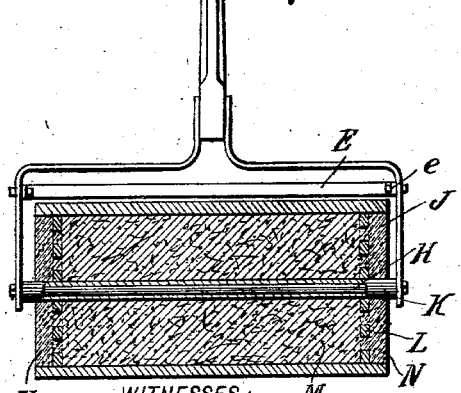
Figure 5:
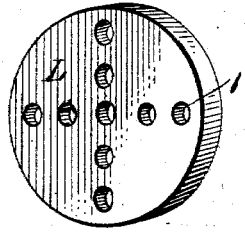

Figure 1 is a side elevation of a land-roller embodying my invention. Fig. 2 is a transverse section of the same on the line 2 2 of Fig. 3. Fig. 3 is a horizontal section thereof on the line 3 3 of Fig. 2. Fig. 4 is a horizontal section of my invention adapted as a lawn-roller, and Fig. 5 is a detailed view of one of the apertured end blocks hereinafter referred to.

In its practical construction my invention consists of an outer shell J, of vitreous material, such as sewer-tile of suitable length, and an inner or main filling M, of concrete, within which is fixedly held a tubular bearing K of gas-pipe, having a length slightly greater than that of the shell J to provide for conveniently mounting the roller within a frame A. When my invention is arranged as a lawn-roller, as shown in Figs. 1 and 3, the frame A has a rectangular shape and is of a length sufficient to surround a pair of rollers held spaced apart with their adjacent ends near a pair of cross-bars B B, bolted at their ends to the frame A, and to said bars at the axial lines of the rollers is bolted a journal-box G to receive the shaft H, which is stationarily held in the tubular bearings K of the rollers, the central bearing-box G and the end bearings F pendently mounted on the ends of the frame A, as clearly shown in Fig. 1, from which it will be also noticed the shaft H is fixedly held in the said bearings by the said screws I of the bearings F.

E E designate scrapers, mounted on the frame A to coöperate with the rollers in the usual manner, said scrapers being screwed to the said frame A by the bolt and nut devices $e$ $e$, whereby the scraping edges $e^x$ can be conveniently adjusted close up to or away from the rollers at the will of the operator.

C designates a seat and foot-rest supporting frame, and C' draft devices, which may be of any well-known construction, as they, together with the supporting means for the rollers on the scraper devices, form, *per se*, no part of my invention, such parts being shown to illustrate a practical application of the same.

The concrete filling M within the shell J, as before stated, is of a length less than that of the shell, whereby to leave a space at each end adapted to receive a wooden block L of the diameter of the tile shell, and the said block L snugly fits the shell, as clearly shown in Fig. 3, from which it will also be seen the said blocks each have a central aperture for the tubular member K and a series of apertures 1 for the purpose of allowing the supplemental filling N, of cement, at each end of the shell to pass through the said blocks and adhere to the main concrete filling M.

So far as described it will be readily apparent the end filling N, besides adding weight and strength to the roller, also serves to tie the several parts constituting the roller into a firm and rigid body, it being obvious that the rollers, with other hollow bearings or shafts K, can be readily fitted within the frame A and the stationary shaft H inserted through the frame-bearings and the member K and held stationary by the bolts to prompt the rollers to turn freely thereon.

The frame A may be so constructed that either one or two horses may be used for drawing the roller or a single roller employed, as shown in Fig. 4, to serve as a hand-manipulated lawn-roller.

Having thus described my invention, what

I claim, and desire to secure by Letters Patent, is—

1. A lawn-roller, comprising a shell of vitreous material, a filling of concrete, a pipe-tubing embedded in said filling, and a supporting-shaft, mounted in the said pipe-tubing, as set forth.

2. A lawn-roller comprising a shell made of tiling, a wood block in each end of the shell, a gas-pipe fixedly mounted in the said blocks in the axial line of the shell, and a solid filling around the said pipe and closing the space within the shell and between the end blocks, as set forth.

3. A land-roller, its shell being of tile and its center being a gas-pipe held in position by wood blocks which fit the inside of the tile and are set in a short distance from the ends of the tile, the tile being filled with concrete between the said wood blocks.

4. A land-roller, its shell being of tile, with wood blocks set in a short distance from its outer ends and its outer ends filled with strong cement outside of wood blocks and having a gas-pipe for its center; all substantially as shown and described.

5. A lawn-roller, comprising a shell formed of tiling, a central filling of concrete, an end filling of cement joined with the concrete, said filling being centrally apertured its length, for the purposes described.

JOHN W. MORGENTHALER.

Witnesses:
F. R. BELLAS,
C. H. MILLER.